(12) United States Patent
Taniguchi et al.

(10) Patent No.: US 8,847,525 B2
(45) Date of Patent: Sep. 30, 2014

(54) MOTOR CONTROL DEVICE AND CONTROL METHOD OF THE SAME

(71) Applicant: Sanyo Denki Co., Ltd., Tokyo (JP)

(72) Inventors: Noriaki Taniguchi, Tokyo (JP); Takahisa Toda, Tokyo (JP); Yo Muramatsu, Tokyo (JP)

(73) Assignee: Sanyo Denki Co., Ltd., Tokyo (JP)

( * ) Notice: Subject to any disclaimer, the term of this patent is extended or adjusted under 35 U.S.C. 154(b) by 18 days.

(21) Appl. No.: 13/747,610

(22) Filed: Jan. 23, 2013

(65) Prior Publication Data

US 2013/0200825 A1 Aug. 8, 2013

(30) Foreign Application Priority Data

Feb. 2, 2012 (JP) ................................. 2012-021128

(51) Int. Cl.
*H02P 3/12* (2006.01)
*H02P 3/22* (2006.01)
*H02P 3/02* (2006.01)

(52) U.S. Cl.
CPC ... *H02P 3/12* (2013.01); *H02P 3/02* (2013.01)
USPC .......................................... 318/379; 318/366

(58) Field of Classification Search
CPC ....................................................... H02P 3/22
USPC ................................... 318/379, 366
See application file for complete search history.

(56) References Cited

U.S. PATENT DOCUMENTS

| | | | |
|---|---|---|---|
| 4,005,348 A * | 1/1977 | Niimi et al. .................... | 318/373 |
| 4,218,643 A * | 8/1980 | Herald et al. .................. | 318/696 |
| 4,243,919 A * | 1/1981 | Brown ........................... | 318/269 |
| 4,311,948 A * | 1/1982 | Brown et al. .................. | 318/759 |
| 7,239,099 B2 * | 7/2007 | Weinmann ............... | 318/400.04 |
| 7,446,492 B2 | 11/2008 | Wei et al. | |

FOREIGN PATENT DOCUMENTS

JP 4451431 B2 4/2010

* cited by examiner

*Primary Examiner* — Erick Glass
(74) *Attorney, Agent, or Firm* — Novak Druce Connolly Bove + Quigg LLP

(57) ABSTRACT

To provide a motor control device which can apply an electric brake to a motor when power supply is stopped, and achieve a miniaturization and a cost reduction. A first switch 11 through a sixth switch 16 connects respective coils L1, L2 and L3 included in a motor to an electric power source 20. The capacitor C accumulates the power supplied from the electric power source 20. A seventh switch 17 connects the capacitor C to a fourth switch 14 through the sixth switch 16, when the power supply from the electric power source 20 is stopped. The operation of the seventh switch 17 causes the fourth switch 14 through the sixth switch 16 to operate by the power accumulated in the capacitor C, and respective coils L1 to L3 are short-circuited to apply the brake to the motor.

7 Claims, 2 Drawing Sheets

MOTOR CONTROL DEVICE AND CONTROL METHOD OF THE SAME

CROSS-REFERENCE TO RELATED APPLICATION

This application claims priority to Japanese Application No. 2012-021128, filed Feb. 2, 2012, the entirety of which is incorporated herein by reference.

BACKGROUND

1. Technical Field

The present invention relates to a motor control device and a control method of the same, which can apply an electric brake to a motor when power supply is stopped.

2. Related Arts

In recent years, when stopping a rotation of a motor, an electric brake is used in addition to a mechanical brake. For example, in a motor which drives vehicles, brakes are electrically applied by power regeneration. In a motor for a cooling fan which cools components of various control devices, when power supply is stopped, the coil of a motor is short-circuited to apply brake electrically, as described in the specification of Japanese Patent No. 4451431 (hereinafter, referred to as Patent Literature 1).

SUMMARY

However, according to the invention described in the above-described Patent Literature 1, when power supply is stopped, a starting device and a driving device which short-circuit a coil of a motor, using power accumulated in a power accumulation device. Since the power accumulation device is required to accumulate the power for operating two devices of the starting device and the drive device, a capacitor provided in the power accumulation device naturally has a large capacitance.

For this reason, the large capacitance of the capacitor leads to difficulty with a miniaturization of a motor control device, and leads to difficulty with a cost reduction of the motor control device.

The present invention is made in order to reduce such obstacle in conventional technique, and has an object to provide a motor control device and its control method which can apply an electric brake to a motor when power supply is stopped, and achieve a miniaturization and a cost reduction.

A motor control device for achieving the above-described object according to the present invention includes a switch group, a capacitor, and a connection switch at the time of stopping electric power supply.

The switch group connects each coil included in a motor to an electric power source. The capacitor accumulates power supplied from the electric power source. The connection switch at the time of stopping electric power supply, connects the capacitor and a part of switches forming the switch group, when power supply from the electric power source is stopped. The part of switches forming the switch group are operated by the power accumulated in the capacitor by an operation of the connection switch at the time of stopping electric power supply, and each coil is short-circuited by an operation of the part of switches to apply a brake to the motor.

A control method of a motor control device for achieving the above-described object according to the present invention, the motor control device includes: a switch group which connects each coil included in a motor to an electric power source; a capacitor which accumulates power supplied from the electric power source; and a connection switch at the time of stopping electric power supply, which connects the capacitor and a part of switches forming the switch group, when power supply from the electric power source is stopped, the control method includes steps of: operating the switch group to connect respective coils to the electric power source in order, to rotate the motor; and when power supply from the electric power source is stopped, operating the part of switches forming the switch group by the power accumulated in the capacitor by an operation of the connection switch at the time of stopping electric power supply, and short-circuiting each coil by an operation of the part of switches to apply a brake to the motor.

According to the present invention, it is sufficient that the capacitor for operating a part of switches which constitute a switch group when power supply from an electric power source has a small capacitance to the extent that the capacitor can accumulate electric power required to operate the part of switches.

Therefore, further miniaturization and cost reduction of the motor control device can be achieved.

DETAILED DESCRIPTION

Hereinafter, embodiments of a motor control device according to the present invention and a control method thereof will be described in detail based on drawings.

[Configuration of Motor Control Device]

Figure 1:
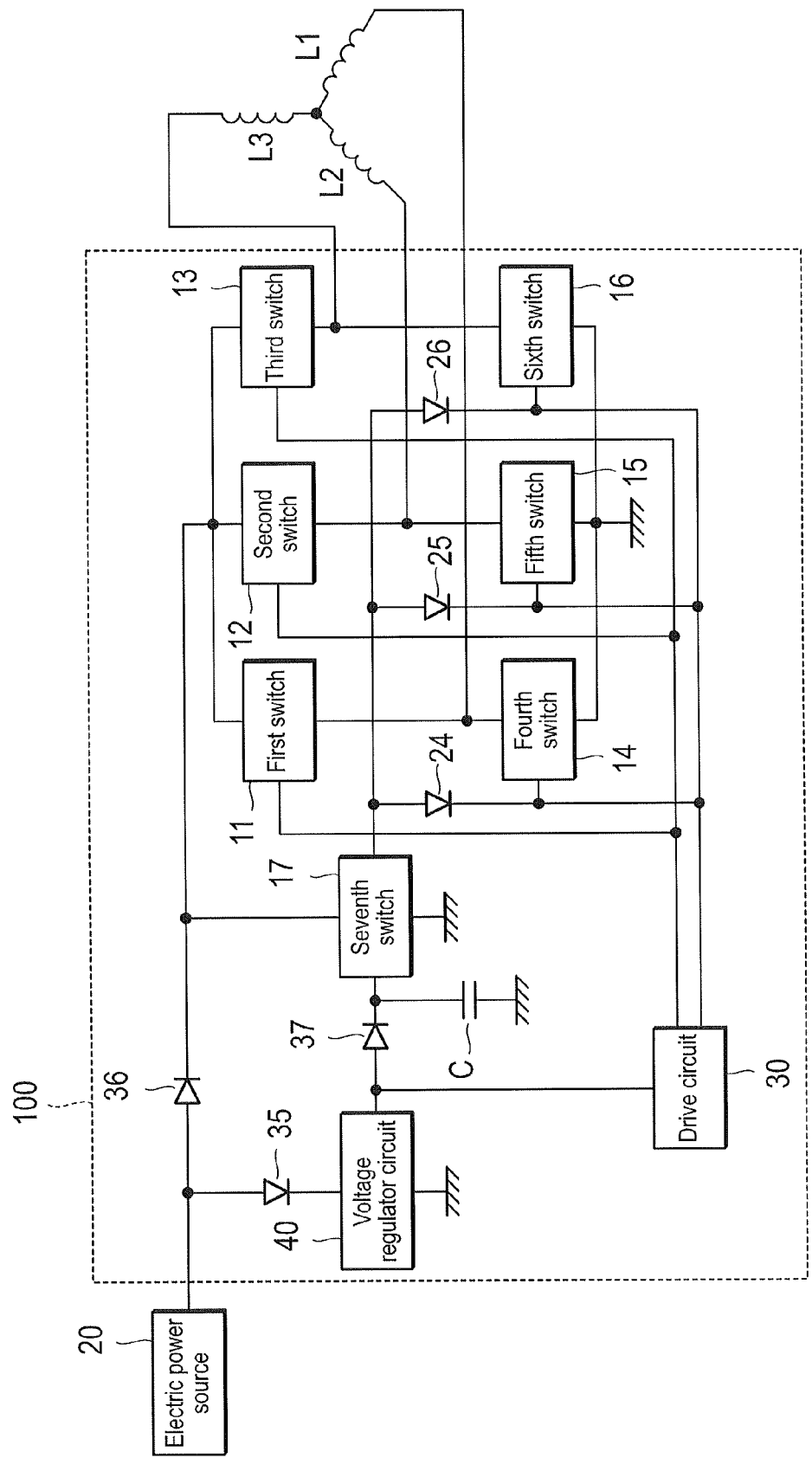
FIG. 1 is a block diagram of a motor control device according to the present embodiment.

FIG. 1 is a block diagram of the motor control device according to the present embodiment.

A first switch 11, a second switch 12, a third switch 13, a fourth switch 14, a fifth switch 15, and a sixth switch 16 included in a motor control device 100 connects coils L1, L2 and L3 included in a motor to an electric power source 20. The first switch 11, the second switch 12, the third switch 13, the fourth switch 14, the fifth switch 15, and the sixth switch 16 form a switch group. The motor exemplified in the present embodiment is a three-phase motor which includes the three coils L1, L2 and L3 connected in star connection, and drives a cooling fan which cools components of various control devices.

The ends of the first switch 11, the second switch 12, and the third switch 13 are connected to the electric power source 20 through a diode 36. The other ends of first switch 11, the second switch 12 and the third switch 13 are connected to the ends of the fourth switch 14, the fifth switch 15 and the sixth switch 16, respectively. The other ends of the fourth switch 14, the fifth switch 15, and the sixth switch 16 are grounded.

The coil L1 is connected to a line which connects the first switch 11 and the fourth switch 14. The coil L2 is connected to a line which connects the second switch 12 and the fifth switch 15. The coil L3 is connected to a line which connects the third switch 13 and the sixth switch 16.

The first switch 11, the second switch 12, the third switch 13, the fourth switch 14, the fifth switch 15, and the sixth switch 16 are connected to a drive circuit 30. The drive circuit 30, when the power is supplied from the electric power source 20, individually controls ON and OFF of the first switch 11, the second switch 12, the third switch 13, the fourth switch 14, the fifth switch 15, and the sixth switch 16. The drive circuit 30 turns on and turns off the first switch 11, the second switch 12, the third switch 13, the fourth switch 14, the fifth switch 15, and the sixth switch 16 according to predetermined combinations and timing, whereby connecting the coils L1, L2, and L3 to the electric power source 20 in order. The current which flows in the coils L1, L2, and L3 rotates the motor, and rotates the cooling fan.

The drive circuit 30 is connected to a voltage regulator circuit 40. The voltage regulator circuit 40 is connected to the electric power source 20 through a diode 35. The voltage regulator circuit 40 regulates voltage from the electric power source 20 to maintain constant voltage, and supplies the constant voltage to the drive circuit 30.

The voltage regulator circuit 40 is connected to the seventh switch 17 through the diode 37. A capacitor C is connected between the diode 37 and the seventh switch 17.

The capacitor C accumulates the power supplied from the voltage regulator circuit 40, when power is supplied from the electric power source 20. The capacitor C is only necessary to have capacitance which can accumulate the power required to operate the fourth switch 14, the fifth switch 15, and the sixth switch 16 for a predetermined time. The power for turning on the fourth switch 14, the fifth switch 15, and the sixth switches 16 at once in a short time such as about for 1 second is extremely small. Therefore, the capacitor C only needs small capacitance, and the miniaturization and the cost reduction of the motor control device 100 can be achieved.

The seventh switch 17 is connected to the electric power source 20 through the diode 36. The seventh switch 17 is connected to the fourth switch 14 through the diode 24, is connected to the fifth switch 15 through the diode 25 and is connected to the sixth switch 16 through the diode 26, respectively. The fourth switch 14, the fifth switch 15, and the sixth switches 16 are a part of switches which form the switch group.

The capacitor C accumulates the power supplied from the voltage regulator circuit 40 connected to the electric power source 20. The seventh switch 17 connects the capacitor C to the fourth switch 14, the fifth switch 15 and the sixth switch 16, when power supply from the electric power source 20 is stopped. The seventh switch 17 functions as a connection switch at the time of stopping electric power supply.

The fourth switch 14, the fifth switch 15, and the sixth switch 16 are formed with a semiconductor, and each of switches is a kind of switch which is short-circuited when the power is supplied from the electric power source 20 or the capacitor C, and is opened when the power is no longer supplied.

The seventh switch 17 includes a circuit which self-holds B contact (normal close) of a mechanical relay by the power supplied from the electric power source 20. The seventh switch 17 is a kind of switch which is opened when the power is supplied from the electric power source 20, and is short-circuited when the power is no longer supplied.

Therefore, when the power is supplied from the electric power source 20, the seventh switch 17 does not connect the voltage regulator circuit 40 and the capacitor C to the fourth switch 14, the fifth switch 15, and the sixth switch 16.

When the power is no longer supplied from the electric power source 20, the seventh switch 17 releases the self-hold and connects the capacitor C to the fourth switch 14, the fifth switch 15 and the sixth switch 16 through B contact.

Therefore, when the power is no longer supplied from the electric power source 20, the fourth switch 14, the fifth switch 15 and the sixth switch 16 are operated with the power accumulated by the capacitor C for a predetermined time, although it is a short time. Furthermore, the fourth switch 14, the fifth switch 15, and the sixth switches 16 turn on at once, and the coils L1, L2, and L3 are short-circuited. Short-circuiting the coils L1, L2, and L3 causes a brake to the motor, and causes a quick stop of the cooling fan.

[Operation of Motor Control Device]

Figure 2:
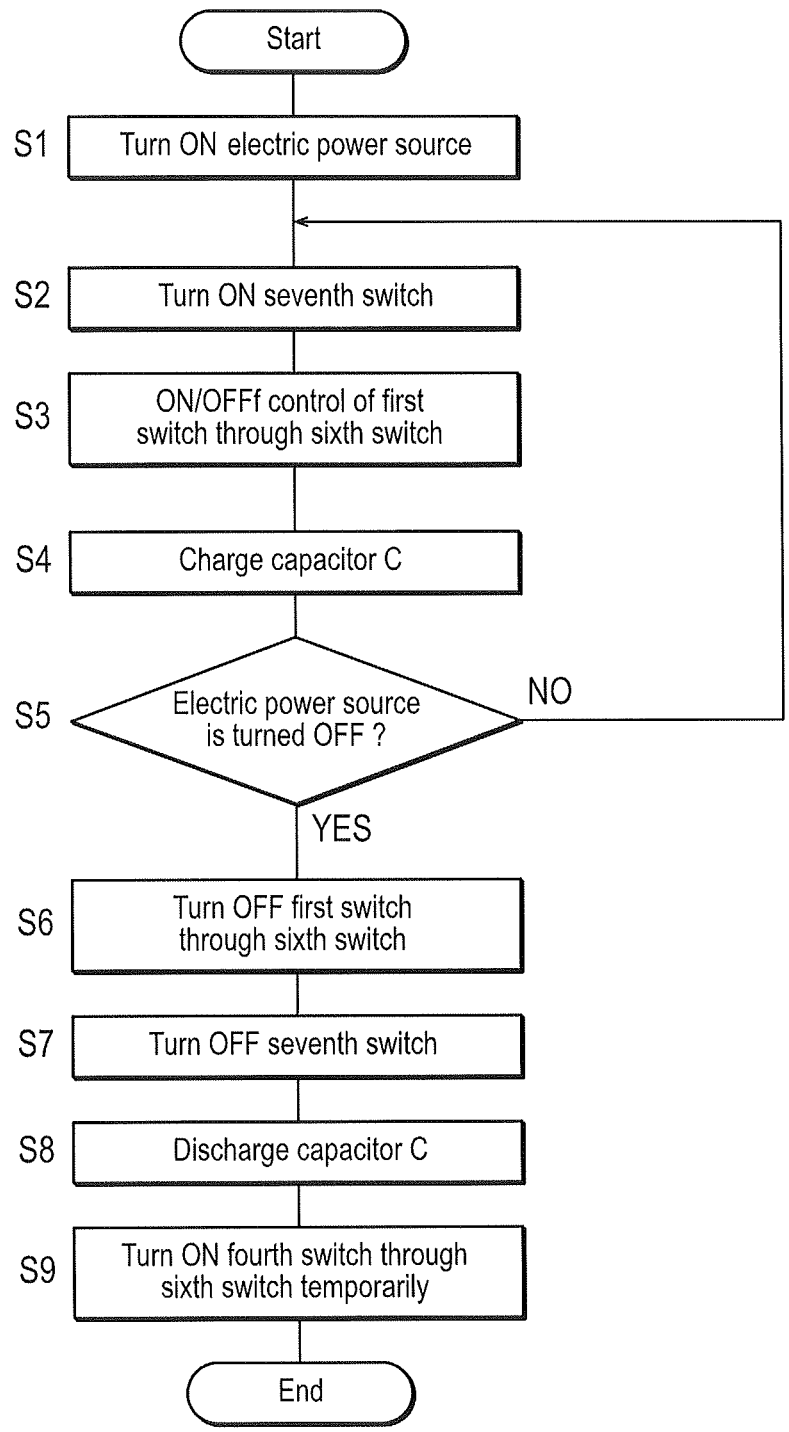
FIG. 2 is an operational flowchart of the motor control device in FIG. 1.

FIG. 2 is an operational flowchart of the motor control device of FIG. 1. This operational flowchart illustrates an operation of the motor control device of FIG. 1 as well as a procedure of the control method of the motor control device.

First, when the electric power source 20 is turned on (step S1), the power is supplied to the seventh switch 17 from the electric power source 20, the seventh switch 17 turns on, a contact opens, and a circuit which connects the voltage regulator circuit 40, the diode 37, and the capacitor C to the fourth switch 14, the fifth switch 15, and the sixth switch 16 is broken (step S2).

Moreover, the power is supplied to the voltage regulator circuit 40 from the electric power source 20, and the power with fixed voltage is supplied to the drive circuit 30 from the voltage regulator circuit 40. The drive circuit 30 controls ON and OFF of the first switch 11 through the sixth switch 16 at a predetermined timing.

For example, when the first switch 11 and the fifth switch 15 are turned on at the same timing, and other switches of the second switch 12, the third switch 13, the fourth switch 14, and the sixth switch 16 are in OFF position, the power is supplied to the coils L1 and L2 from the electric power source 20 to form a magnetic field in the motor. Moreover, when the second switch 12 and the sixth switch 16 are turned on at the same timing, and other switches of the first switch 11, the third switch 13, the fourth switch 14, and the fifth switch 15 are in OFF position, the power is supplied to the coils L2 and L3 from the electric power source 20 to form a magnetic field in the motor. Furthermore, when the first switch 11 and the sixth switch 16 are turned on at the same, other switches of the second switch 12, the third switch 13, the fourth switch 14, and the fifth switch 15 are in OFF position, the power is supplied to the coils L1 and L3 from the electric power source 20 to form a magnetic field in the motor. Controlling continuously ON and OFF of the first switch 11 through the sixth switch 16 as described above allows a rotation of the motor (step S3).

When the power is supplied from the electric power source 20, the power is accumulated in the capacitor C from the voltage regulator circuit 40 (step S4).

The operation from steps S2 to S5 is repeated until the electric power source 20 is turned off, and the motor rotates the cooling fan (step S5: NO). Moreover, charge of the capacitor C is continued.

When the electric power source 20 is turned off (step S5: YES), operations of the voltage regulator circuit 40 and the drive circuit 30 are stopped, and the first switch 11 through the sixth switch 16 are turned off. When the first switch 11 through the sixth switch 16 are in OFF position, the first switch 11 through the sixth switch 16 breaks the connections between the electric power source 20 and each of coils L1, L2 and L3 (step S6).

When the electric power source 20 is turned off, the seventh switch 17 is turned off, the contact closes, and the seventh switch 17 forms a circuit which connects the capacitor C to the fourth switch 14, the fifth switch 15, and the sixth switch 16 (step S7).

When the capacitor C has been connected to the fourth switch 14, the fifth switch 15, and the sixth switch 16, the capacitor C discharges to supply the power accumulated in the capacitor C to the fourth switch 14 through the diode 24, to the fifth switch 15 through the diode 26, and to the sixth switch 16 through the diode 25 (step S8).

The fourth switch 14, the fifth switch 15, and the sixth switch 16 is turned on temporarily by the power accumulated in the capacitor C to short-circuit the coils L1, L2, and L3. The period, in which the fourth switch 14, the fifth switch 15, and the sixth switch 16 are in ON position, depends on the power (the amount of charge) accumulated in the capacitor C. When the coils L1, L2, and L3 are short-circuited, the current which is generated by self-power generation due to a rotation of the motor flows into the coils L1, L2, and L3, and the current produces brake force. For this reason, the motor is stopped when the electric power source 20 is turned off (step S9).

In this way, the motor control device and the control method of the motor control device according to the present embodiment can prevent a worker's injury even if the cooling fan does not have a finger guard, for example when the cooling fan is applied operations of hot plug.

Normally, when powered off, it is difficult for a motor to apply brakes electrically. Moreover, even if a function is provided in which the motor can be applied brakes electrically, it is required a capacitor with very large capacitance which can accumulate enough power to use the function when powered off.

In the present embodiment, the seventh switch is provided which can form a circuit without power when powered off, and the capacitor with small capacity is provided which can accumulate power required for turning on the fourth switch 14, the fifth switch 15, and the sixth switch 16 in a short time. Accordingly, as described above, without supplying power to the drive circuit which applies brakes to the motor electrically, it is possible to fulfill a brake function.

Therefore, according to the present invention, further miniaturization and cost reduction for the motor control device can be achieved, due to an amount of reduction for the capacitance of the capacitor. Moreover, the power required to fulfill the brake function may be extremely small, it can contribute also to power-saving.

What is claimed is:

1. A motor control device comprising:
a switch group which connects each coil included in a motor to an electric power source;
a capacitor which accumulates power supplied from the electric power source; and
a connection switch at the time of stopping electric power supply, which connects the capacitor and a part of switches forming the switch group, when power supply from the electric power source is stopped,
wherein
the connection switch at the time of stopping electric power supply is a kind of switch which is opened when the power is supplied from the electric power source, and is short-circuited when power is no longer supplied, and
the part of switches forming the switch group are operated by the power accumulated in the capacitor by a short circuit of the connection switch at the time of stopping electric power supply, and each coil is short-circuited by an operation of the part of switches to apply a brake to the motor.

2. The motor control device according to claim 1, wherein the part of switches forming the switch group are a kind of switches which are short-circuited when power is supplied from the electric power source the capacitor, and is opened when power is no longer supplied.

3. The motor control device according to claim 2, wherein the connection switch at the time of stopping electric power supply includes a circuit which self-holds B contact of a mechanical relay by the power supplied from the electric power source, and releases the self-hold and connects the capacitor to the part of switches forming the switch group through the B contact, when the power is no longer supplied from the electric power source.

4. The motor control device according to claim 1, wherein when the power is supplied from the electric power source, an operation of the switch group is controlled by a drive circuit which operates switches of the switch group respectively, and the operation of the switch group causes connections of respective coils to the electric power source in order, to rotate the motor.

5. A The motor control device according to claim 1, wherein the capacitor has a capacitance which can accumulate the power required to operate the part of switches forming the switch group for a predetermined time.

6. The motor control device according to claim 1, wherein the motor drives a cooling fan which cools components of various control devices.

7. A control method of a motor control device which comprises:
a switch group which connects each coil included in a motor to an electric power source;
a capacitor which accumulates power supplied from the electric power source; and
a connection switch at the time of stopping electric power supply, which connects the capacitor and a part of switches forming the switch group, when power supply from the electric power source is stopped,
the control method comprising steps of:
operating the switch group to connect respective coils to the electric power source in order, to rotate the motor; and
when power supply from the electric power source is stopped, operating the part of switches forming the switch group by the power accumulated in the capacitor by a short-circuit of the connection switch at the time of stopping electric power supply, and short-circuiting each coil by an operation of the part of switches to apply a brake to the motor,
wherein the connection switch at the time of stopping electric power supply is a kind of switch which is opened when the power is supplied from the electric power source, and is short-circuited when power is no longer supplied.

* * * * *